United States Patent
Geissinger

(10) Patent No.: US 10,678,793 B2
(45) Date of Patent: Jun. 9, 2020

(54) DOCUMENT STORE WITH NON-UNIFORM MEMORY ACCESS AWARE HIGH PERFORMANCE QUERY PROCESSING

(71) Applicant: SAP SE, Walldorf (DE)

(72) Inventor: Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 15/354,841

(22) Filed: Nov. 17, 2016

(65) Prior Publication Data

US 2018/0137172 A1    May 17, 2018

(51) Int. Cl.
  *G06F 3/06*   (2006.01)
  *G06F 16/00*  (2019.01)
  *G06F 12/0866*  (2016.01)
  *G06F 16/2455*  (2019.01)
  *G06F 16/27*  (2019.01)

(52) U.S. Cl.
  CPC .......... *G06F 16/2455* (2019.01); *G06F 16/27* (2019.01)

(58) Field of Classification Search
  CPC ..................... G06F 17/30477; G06F 17/30283
  See application file for complete search history.

(56) References Cited

U.S. PATENT DOCUMENTS

| | | | | |
|---|---|---|---|---|
| 5,765,146 A * | 6/1998 | Wolf | ................ | G06F 17/30445 |
| 7,984,043 B1 * | 7/2011 | Waas | ................ | G06F 17/30932 707/718 |
| 9,886,483 B1 * | 2/2018 | Harrison | ................ | G06F 16/28 |
| 2007/0263544 A1 * | 11/2007 | Yamanaka | ............. | H04L 45/12 370/238 |
| 2009/0119484 A1 * | 5/2009 | Mohl | .................... | G06F 9/4494 712/201 |
| 2012/0311269 A1 * | 12/2012 | Loh | ....................... | G06F 12/126 711/133 |
| 2013/0117305 A1 * | 5/2013 | Varakin | ................ | G06F 9/5072 707/769 |

(Continued)

OTHER PUBLICATIONS

Specification of the parent application (U.S. Appl. No. 15/276,717) of the Continuation-in-part (Year: 2016).*

(Continued)

*Primary Examiner* — Mark D Featherstone
*Assistant Examiner* — Kweku William Halm
(74) *Attorney, Agent, or Firm* — Jones Day

(57) ABSTRACT

Systems and methods are described for implementation by a computing system having a non-uniform memory access (NUMA) architecture comprising a plurality of NUMA nodes. A query of a document store storing a collection of slices each comprising one or more documents is received from a client. Thereafter, it is determined which of the slices within the document store are required for execution of the query. An execution plan is then generated, using the query, that comprises a plurality of nodes each specifying at least one database operation to execute a portion of the query. The execution plan assigns one of the plurality of NUMA nodes to each slice determined to be required for execution of the query. The database operations specified by the nodes of the execution plan are then executed using the corresponding assigned NUMA nodes for the associated slice. Data responsive to the query is then provided to the client.

20 Claims, 7 Drawing Sheets

(56) References Cited

U.S. PATENT DOCUMENTS

| | | | | |
|---|---|---|---|---|
| 2015/0363465 A1* | 12/2015 | Bordawekar | ..... | G06F 17/30463 |
| | | | | 707/718 |
| 2016/0034587 A1* | 2/2016 | Barber | .............. | G06F 16/24532 |
| | | | | 707/754 |
| 2016/0092259 A1* | 3/2016 | Mehta | ................. | G06F 9/45558 |
| | | | | 718/1 |
| 2016/0094417 A1* | 3/2016 | Bonagiri | ............. | H04L 41/5054 |
| | | | | 709/226 |
| 2016/0098453 A1* | 4/2016 | Gaza | ................ | G06F 17/30486 |
| | | | | 707/718 |
| 2018/0089269 A1* | 3/2018 | Pal | .................... | G06F 17/30463 |

OTHER PUBLICATIONS

Drawings of the parent application (U.S. Appl. No. 15/276,717) of the Continuation-in-part (Year: 2016).*

* cited by examiner though specific queries (e.g., # US 10,678,793 B2

DOCUMENT STORE WITH NON-UNIFORM MEMORY ACCESS AWARE HIGH PERFORMANCE QUERY PROCESSING

TECHNICAL FIELD

The subject matter described herein relates to a document store which processes query in a non-uniform memory access (NUMA) aware manner.

BACKGROUND

Companies continue to generate increasingly larger amounts of data year over year. Rapid and convenient access to such data by a large number of concurrent users can present problems. For example, a company may store data across multiple databases of varying types which may be distributed amongst various computing nodes. These types can vary differently such as the manner in which data is stored, structured, and accessed. Typical computing architectures require separate and distinct queries to access data within the respective database types.

SUMMARY

Systems and methods are described for implementation by a computing system having a non-uniform memory access (NUMA) architecture comprising a plurality of NUMA nodes. A query of a document store storing a collection of slices each comprising one or more documents is received from a client. Thereafter, it is determined which of the slices within the document store are required for execution of the query. An execution plan is then generated, using the query, that comprises a plurality of nodes each specifying at least one database operation to execute a portion of the query. The execution plan assigns one of the plurality of NUMA nodes to each slice determined to be required for execution of the query. The database operations specified by the nodes of the execution plan are then executed using the corresponding assigned NUMA nodes for the associated slice. Data responsive to the query is then provided to the client.

The document store stores the collection of documents in JavaScript Object Notation (JSON) format. The document store can include a plurality of partitions defined by a partition specification. Each partition can include a plurality of slices and at least one index.

The document store can form part of a database system having a second database having a different data storage format from the document store and wherein the query implicates data in the second database. Execution of a plurality of transactions can be coordinated between the document store and the second database. All changes specified by the query can be persisted in the second database including changes implicating data stored within the document store. The second database can be an in-memory relational database and the document store can store data on physical disk storage.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides techniques for processing queries of a document store which more efficiently utilize processing and memory resources. In addition, the current subject matter is advantageous in that it allows for a single query to access/manipulate data within different database types (e.g., disk-based databases and in-memory database, etc.) including a document store. Further, the current subject matter permits the management of transactions specified by such queries across different database types that typically would require complex coordination and/or separately processed transactions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the interplay among two or more databases when concurrently executing multiple transactions in which one of the databases is a document store. In some variations, a first database acts as a master database and the other acts as a slave database with regard to transaction management. In some implementations, both databases are relational databases; however, they can differ in the manner in which they store data. For example, one database can be disk-based while the other database can be an in-memory database storing data in main memory.

Figure 1:
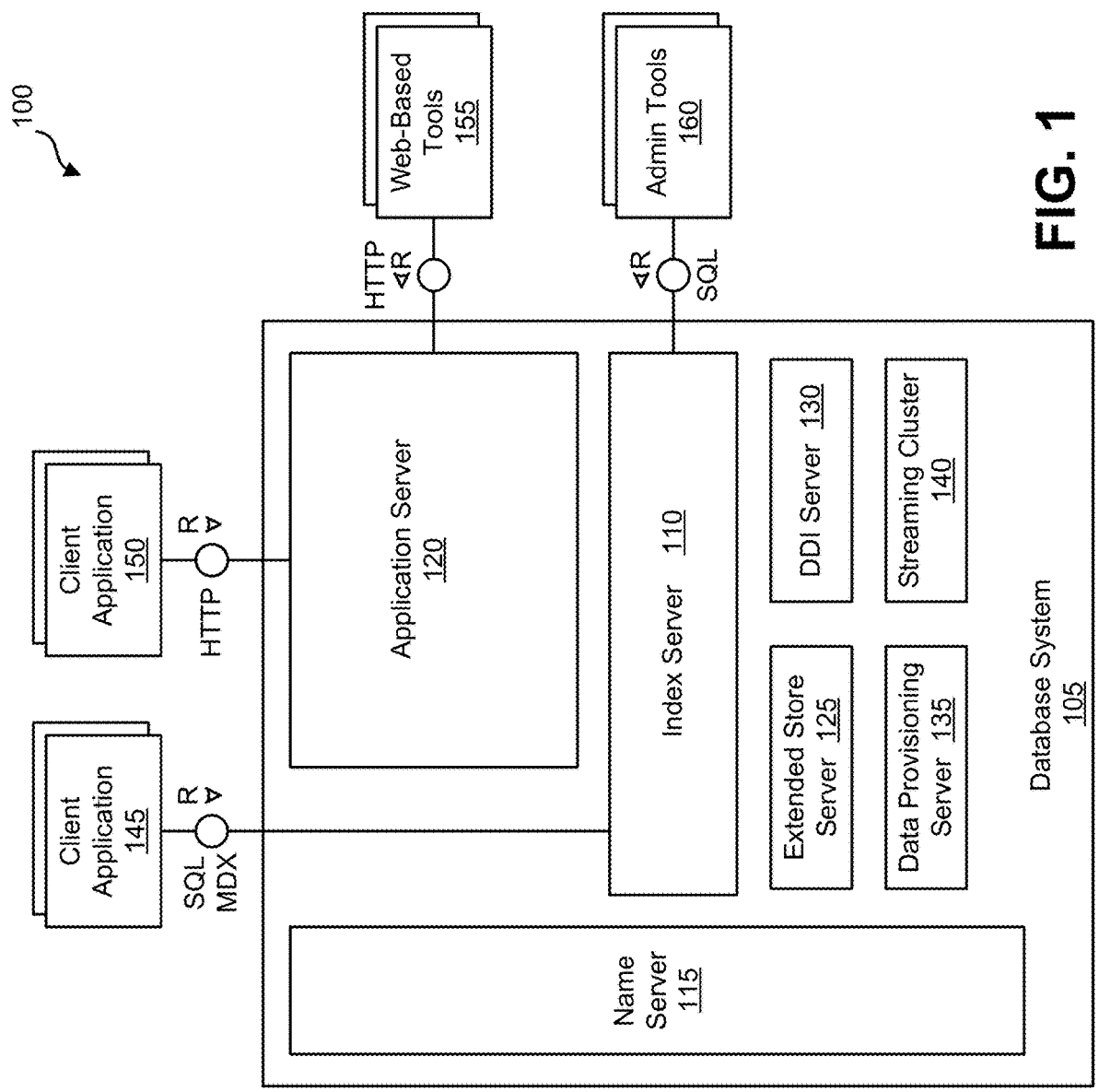
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
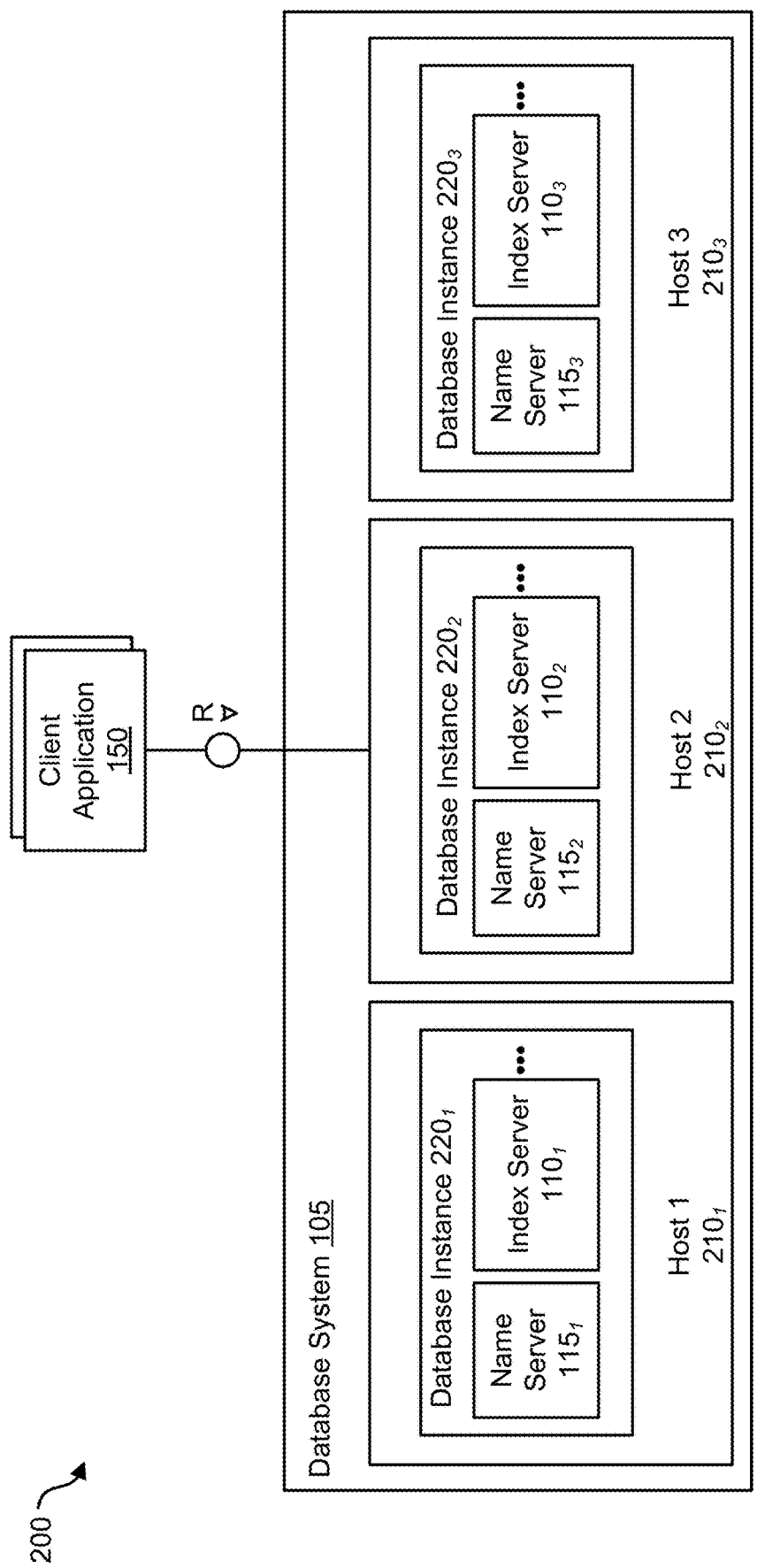
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
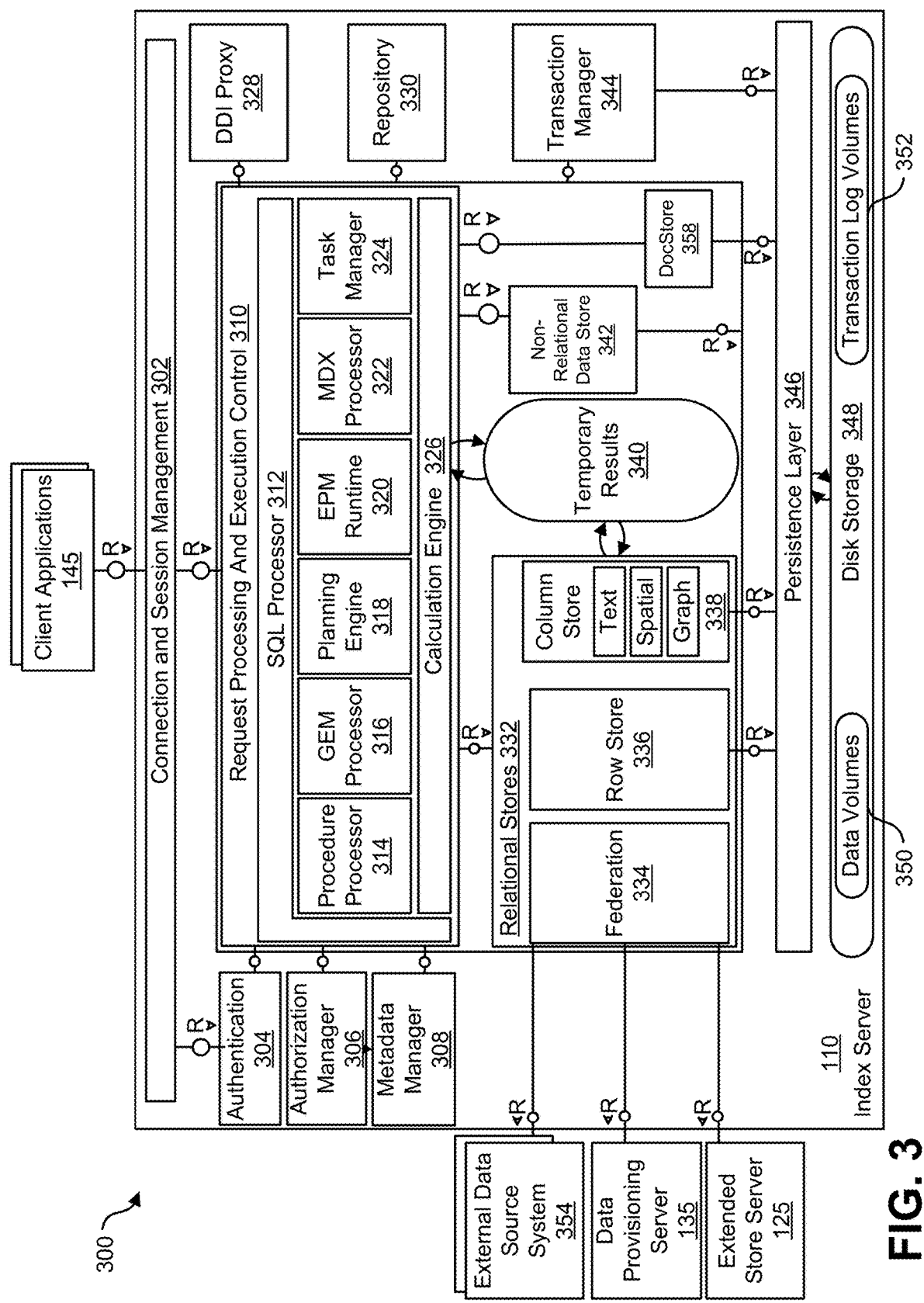
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

Furthermore, the database system 105 can include a document store (DocStore) 358. In some arrangements, the DocStore 358 is external to the database system 105. In either arrangement, the DocStore 358 is in communication with the index server 125. The DocStore 358 is a document-oriented data store for storing, retrieving, and managing document oriented/semi-structured data (referred to herein as documents). The documents within the DocStore 358 can encapsulate and encode data in various formats such as, for example, Extensible Markup Language (XML), YAML, JavaScript Object Notation (JSON), B SON, and the like. For illustration purposes (unless otherwise specified), references are made herein of the DocStore 358 comprising a collection of JSON documents. The DocStore 358 can store the documents in physical persistence such as disk storage and/or the documents can be loaded into main memory.

The client applications 145 can initiate various transactions that involve both data within the index server 110 (e.g., data stored in the relational store 332, the non-relational data store 342, disk storage 348, etc.) as well as data within the DocStore 358. Stated differently, the database system 105 can have the same or overlapping transaction boundaries with the DocStore 358 so that coordination is required amongst the various data sources. In an arrangement, the transaction manager 344 can be made the leading or dominant transaction manager so that transaction managing facilities of the DocStore 358 or another "slave" database can be channeled and managed by transaction manager 344. Documents within the DocStore 358 can be accessed or otherwise manipulated via various protocols. For example, client applications 145 can initiate various database manipulation language (DML) statements to select, insert, delete and update data encapsulated in documents within the DocStore 358. Similarly, the client applications 145 can initiate various data definition language (DDL) statements to create, drop, alter, and rename data encapsulated within documents within the DocStore 358. As a further example, the client applications 145 can use other protocols such as QL to retrieve data encapsulated within documents in the DocStore 358.

The DocStore 358 can comprise a persistence manager as well as a separate transaction manager. The persistence manager can cause data written into the DocStore to be written into the disk storage 348 (i.e., the persistence) of the database system 105. Despite the DocStore 358 being an independent database or data store with its own dedicated binary data format, the persistence 348 of the main database system 105 can be utilized. The transaction manager of the DocStore 358 can concurrently notifies the transaction manager 344 of the index server 110 about the changes. The transaction manager 344 then oversees the commit of the data using a commit writer that assigns commit IDs to the data stored in the disk storage 348.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
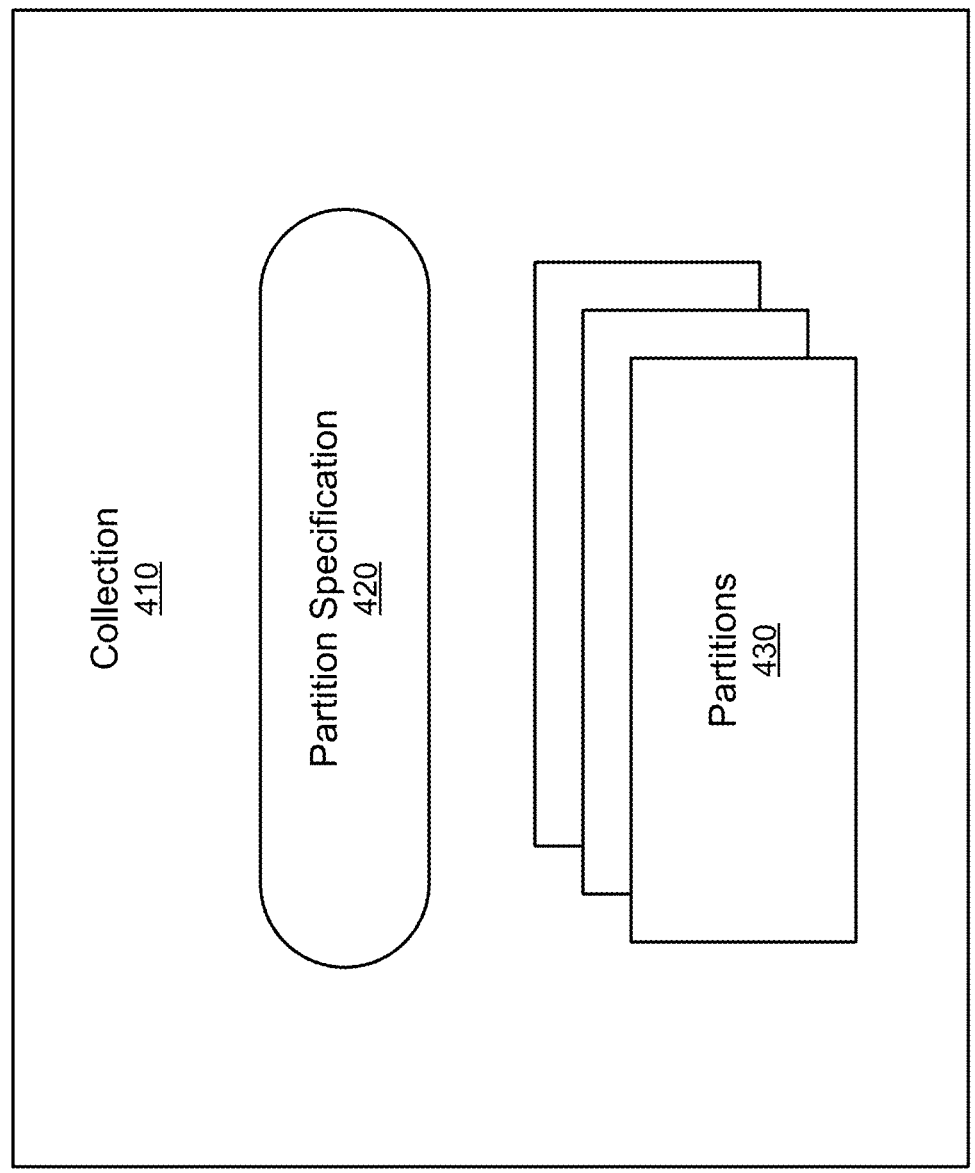
FIG. 4 is a system diagram of a document store.
Figure 5:
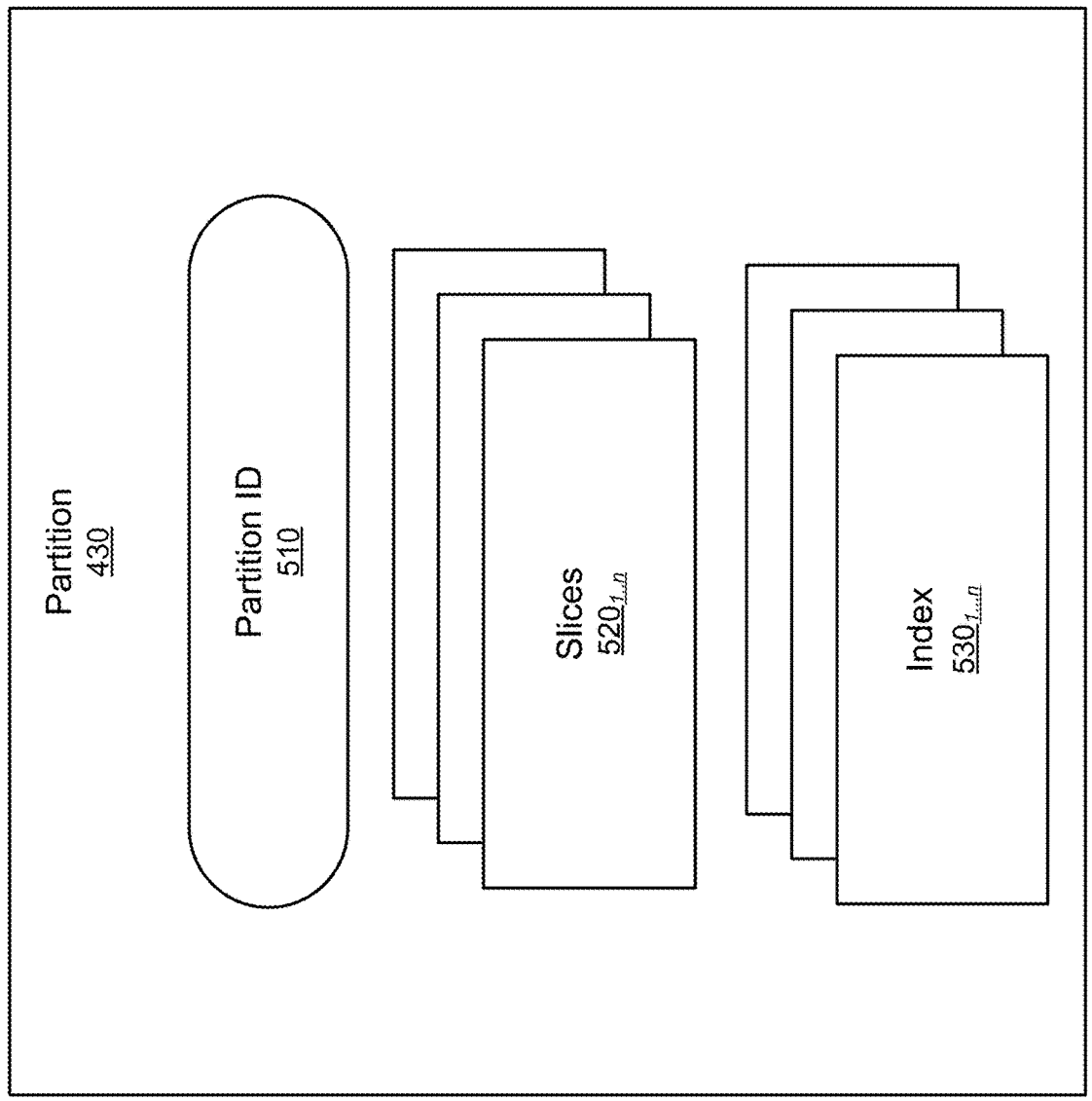
FIG. 5 is a system diagram of a partition of the document store as in FIG. 6.

With reference to diagram 400 of FIG. 4, the DocStore 358 organizes documents in collections 410. As noted above, the documents within the DocStore 358 can take different formats and the use below of JSON documents is for illustrative purposes (unless otherwise specified). A collection of documents 410 can be characterized as being a list of documents. A collection of documents 410 can have several partitions $430_{1...n}$ which can be collectively defined by a partition specification 420. The partition specification 420 cab define how the collection of documents are to be grouped or otherwise split amongst the partitions.

Figure 6:
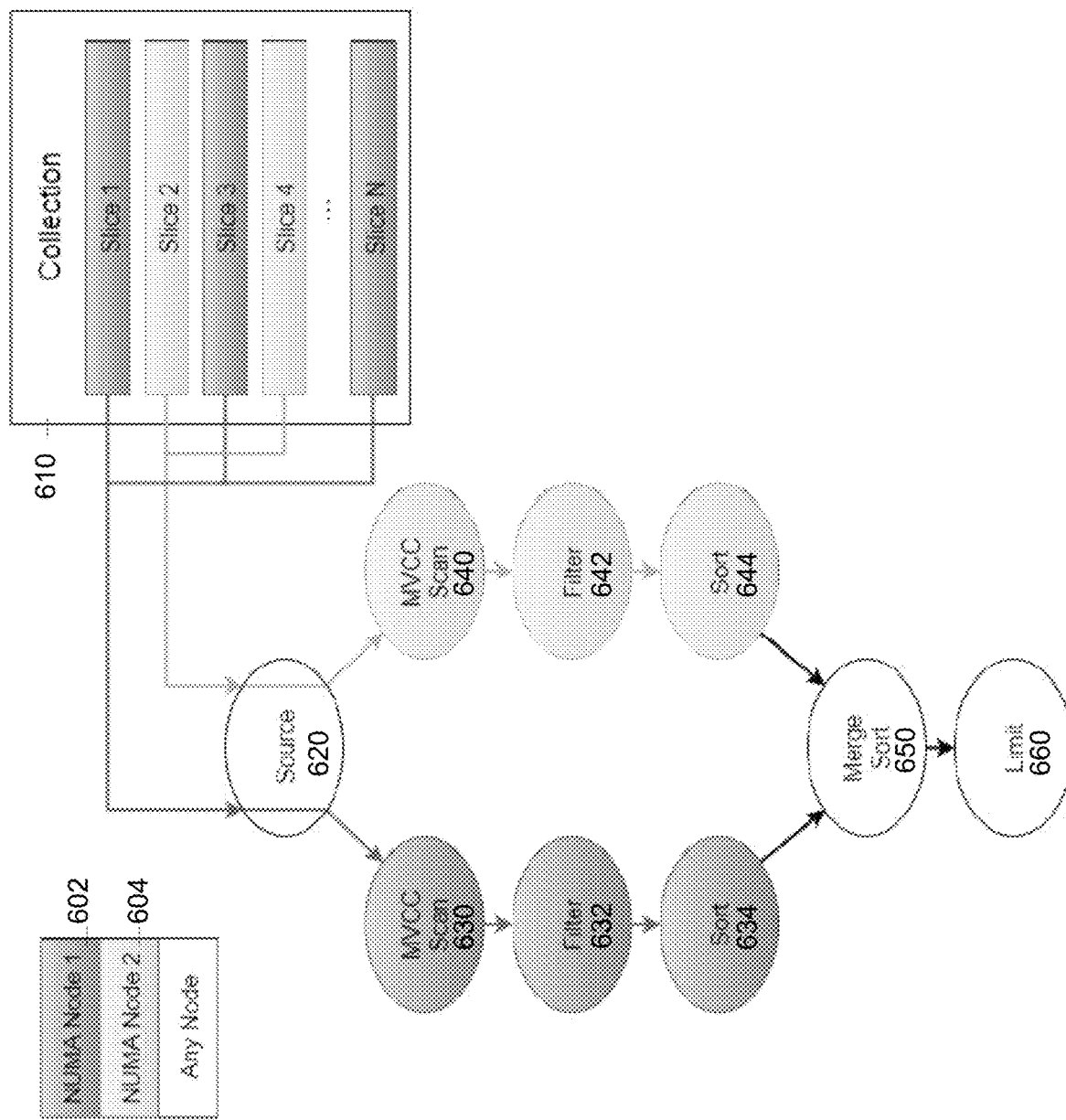
FIG. 6 is a diagram illustrating NUMA aware query processing.

Diagram 500 of FIG. 6 illustrates contents of a partition 520. Each partition 520 can comprise a unique identification 610 and the documents within such partition 520 are stored within a slice 620. Furthermore, each partition 520 can include at least one index 630 for mapping terms and the like to sections of the documents. In other variations, indexes can be omitted.

The DocStore 358 can provide a query execution framework optimized for fast processing on NUMA machines. NUMA awareness as provided herein allows for improved performance, especially with computing systems having many processing cores. With reference to diagram 600 of FIG. 6, two NUMA nodes 602, 604 can execute queries on a collection 610 organized into slices 1 to n. As described below, each slice contains one or multiple documents, usually up to a total size of some mega bytes (i.e. 32 MB per slice). The memory allocated by a slice is assigned to one particular NUMA node 602 or 604. Each slice can be aware of the NUMA node 602, 604 to which it is assigned and the execution framework use of this information to better schedule operations.

Referring again to FIG. 6, it will be seen that certain operations can be performed by a particular one of the NUMA nodes 602, 604, while other operations can be performed by either node. In particular, FIG. 6 illustrates a potential execution plan for a query of the document store 358 and the input slices.

Each query received by the DocStore 359 can be translated into an execution graph with each node of such execution graph having properties as follows. Each node of the execution graph can be assigned to one of the NUMA nodes 602, 604. The system can be arranged such that only one thread executes a node of the execution graph at any given time. One byproduct of such an arrangement is that there is no need to address locking as one thread handles one data package at a time. In addition, if there are multiple data packages they can be queued for execution. Each node of the execution graph can also have an internal state. This internal state information can be used by various operations. For example, the input queue on a node must be empty in order to sort an entire result. The internal state can be used to buffer all documents until the input queue is empty and only then start sorting the full result. Another example, is a limit node which limits the result to N documents. So the node uses the internal state to track how many documents have been processed and increments the counter accordingly. If the number of processed documents reaches the limit, processing of new incoming documents is stopped and new incoming documents are simply ignored. Other nodes can use the internal state for other purposes. As the internal state is node local, no locking is required.

Each node of the execution graph can also be configured to handle three events: initialization, tick, and finish. If the node of the execution graph is triggered for the first time, it can be used to initialize internal structures lazily. In addition, a tick can be called for each data package. 'tick' can be invoked for each new incoming data package. Most of the time such an incoming data package is a slice; however, it can also be other internal data structures (e.g., for aggregation queries some nodes may return a hashmap of some temporary aggregation result, etc.). So the next node's tick function must be able to handle also this format. In general init/finish are invoked one time each and tick for each data package, which can be in different formats. Tick contains the main logic. The finish event can be invoked after all parent nodes of the execution graph have been executed. This event can be used to clear internal state information and potentially to pass on any remaining data packages to following nodes.

The source node 620 of the execution graph acts to go through the list of input slices and forward the corresponding slice to the corresponding child node of the execution graph. The source node 620 is not NUMA aware and can be executed by either of NUMA node 1 602 or NUMA node 2 604. For example, source node 620 can forward slices 1, 3, and N as data packages to a multi-version concurrency control (MVCC) scan node 630 which is executed by NUMA node 1 602. Similarly, source node 620 can forward slices 2 and 4 as data packages to an MVCC scan node 640 which is executed by NUMA node 2 604. The execution graph includes others nodes such as a filter node 632 and a sort node 634 which are also executed by NUMA node 1 602 as well as a filter node 642 and a sort node 644 which are also executed by NUMA node 2 604. Subsequent operations such as those executed by a merge/sort node 650 of the execution graph or a limit node 660 can be executed by either of the NUMA node 1 602 or NUMA node 2 604.

The execution graph in the example of FIG. 6 contains two pipelines which are assigned to two different NUMA nodes. Usually, the goal is to have at least one pipeline per NUMA node. The more pipelines/nodes that are available, the more parallelization can occur (because only one thread can be user per node).

In addition, the internal state of each node can be stored on the corresponding NUMA node. With such an arrangement, for nodes which have been assigned to one particular NUMA node, required data (the incoming data package and the internal state, etc.) is typically made available on the same NUMA node which results in very low memory latency.

If one thread finishes the tick( ) on one node, the thread can immediately try to execute the tick( ) event of the following node if: (i) the node is assigned to the same NUMA node, and (ii) the next node is not already being processed by some other thread. This arrangement can improve performance drastically, because the same thread executes multiple nodes and keeps most of the data in its local CPU cache. Without such an arrangement, three threads would likely execute nodes 630, 632 and 634. So each thread would have to load the incoming data packages to its cache first and then start processing. The loading from DRAM into cache can be omitted if the same threads executes all three nodes.

Figure 7:
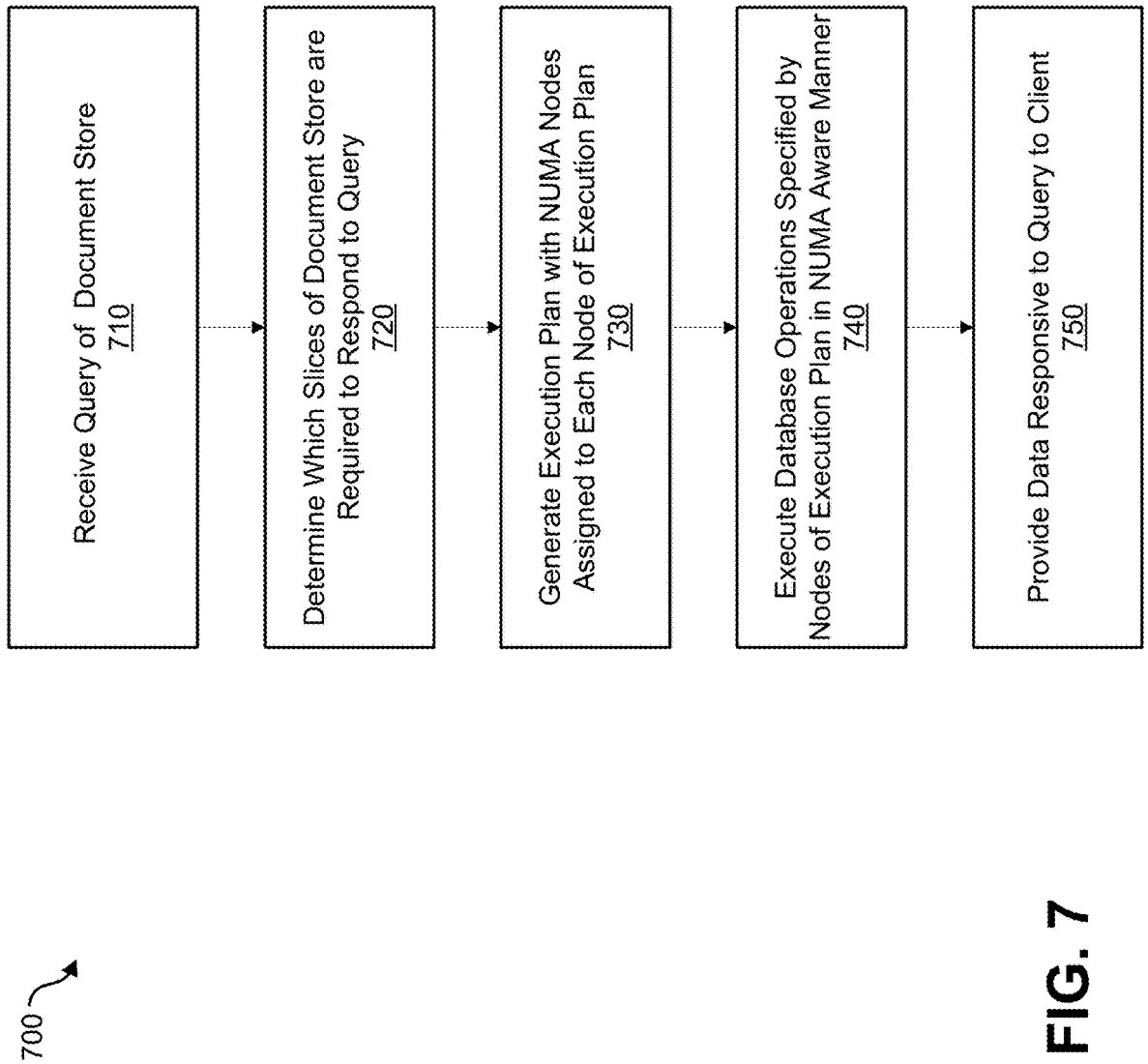
FIG. 7 is a process flow diagram illustrating NUMA aware query processing.

FIG. 7 is a process flow diagram 700 of a method for implementation by a computing system having a non-uniform memory access (NUMA) architecture comprising a plurality of NUMA nodes. The method can include, at 710, receiving, from a client, a query of a document store storing a collection of slices each comprising one or more documents. Thereafter, at 720, it is determined which of the slices within the document store are required for execution of the query. Using this information and the query, at 730, an execution plan is generated that includes a plurality of nodes each specifying at least one database operation to execute a portion of the query. The execution plan assigns one of the plurality of NUMA nodes to each slice determined to be required for execution of the query. Subsequently, at 740, the database operations specified by the nodes of the execution plan are executed using the corresponding assigned NUMA nodes for the associated slices. Optionally, at 750, data responsive to the query can be provided to the client.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by a computing system having a non-uniform memory access (NUMA) architecture comprising a plurality of NUMA nodes, the method comprising:
   receiving, from a client, a query of a document store storing a collection of slices each comprising one or more documents, wherein memory associated with each slice is assigned to one of the plurality of NUMA nodes;
   determining which of the slices within the document store are required for execution of the query to form a list of slices;
   generating, using the query, an execution plan comprising a plurality of nodes including a source node and a plurality of child nodes each specifying at least one database operation to execute a portion of the query, the execution plan comprising a plurality of pipelines of nodes, the execution plan assigning one of the plurality of NUMA nodes to each slice determined to be required for execution of the query, wherein each slice is aware of the NUMA node assigned thereto;
   executing the database operations specified by the nodes of the execution plan using the corresponding assigned NUMA nodes for the associated slices, the executing comprising the source node going through the list of slices and forwarding each of the slices including the corresponding one or more documents as a data package to a corresponding child node of the execution plan; and
   providing data responsive to the query to the client;
   wherein:
     each pipeline is assigned to a different one of the plurality of NUMA nodes; and
     only one thread executes a node of the execution graph at any given time.

2. The method of claim 1, wherein the document store stores the documents in JavaScript Object Notation (JSON) format.

3. The method of claim 1, wherein the document store comprises a plurality of partitions defined by a partition specification.

4. The method of claim 3, wherein each partition comprises a plurality of slices and at least one index.

5. The method of claim 1, wherein the document store forms part of a database system having a second database having a different data storage format from the document store and wherein the query implicates data in the second database.

6. The method of claim 5 further comprising:
   coordinating execution of a plurality of transactions between the document store and the second database.

7. The method of claim 6 further comprising:
   persisting all changes specified by the query in the second database including changes implicating data stored within the document store.

8. The method of claim 7, wherein the second database is an in-memory relational database and the document store stores data on physical disk storage.

9. The method of claim 1, wherein each NUMA node comprises at least one associated data processor and memory storing instructions for execution by the associated at least one data processor.

10. A system comprising:
    a document store storing a collection of slices each comprising one or more documents; and
    a plurality of non-uniform memory access (NUMA) nodes each comprising at least one data processor and memory for storing instructions for execution by the associated at least one data processor;

wherein:
- memory associated with each slice is assigned to one of the plurality of NUMA nodes;
- the document store receives a query from a client;
- it is determined which of the slices within the document store are required for execution of the query to form a list of slices;
- an execution plan is generated, using the query, the execution plan comprising a plurality of nodes including a source node and a plurality of child nodes each specifying at least one database operation to execute a portion of the query, the execution plan comprising a plurality of pipelines of nodes, the execution plan assigning one of the plurality of NUMA nodes to each slice determined to be required for execution of the query, wherein each slice is aware of the NUMA node assigned thereto;
- the database operations specified by the nodes of the execution plan are executed using the corresponding assigned NUMA nodes for the associated slices, the executing comprising the source node going through the list of slices and forwarding each of the slices including the corresponding one or more documents as a data package to a corresponding child node of the execution plan;
- data responsive to the query is provided to the client;
- each pipeline is assigned to a different one of the plurality of NUMA nodes; and
- only one thread executes a node of the execution graph at any given time.

11. The system of claim 10, wherein the document store stores the documents in JavaScript Object Notation (JSON) format.

12. The system of claim 10, wherein the document store comprises a plurality of partitions defined by a partition specification.

13. The system of claim 12, wherein each partition comprises a plurality of slices and at least one index.

14. The system of claim 10, wherein the document store forms part of a database system having a second database having a different data storage format from the document store and wherein the query implicates data in the second database.

15. The system of claim 14, wherein execution of a plurality of transactions is coordinated between the document store and the second database.

16. The system of claim 15, wherein all changes specified by the query are persisted in the second database including changes implicating data stored within the document store.

17. The system of claim 16, wherein the second database is an in-memory relational database and the document store stores data on physical disk storage.

18. A non-transitory computer program product storing instructions for implementation by a computing system having a non-uniform memory access (NUMA) architecture comprising a plurality of NUMA nodes, the instructions, when executed, result in operations comprising:

receiving, from a client, a query of a document store storing a collection of slices each comprising one or more documents, wherein memory associated with each slice is assigned to one of the plurality of NUMA nodes;

determining which of the slices within the document store are required for execution of the query to form a list of slices;

generating, using the query, an execution plan comprising a plurality of nodes including a source node and a plurality of child nodes each specifying at least one database operation to execute a portion of the query, the execution plan comprising a plurality of pipelines of nodes, the execution plan assigning one of the plurality of NUMA nodes to each slice determined to be required for execution of the query, wherein each slice is aware of the NUMA node assigned thereto;

executing the database operations specified by the nodes of the execution plan using the corresponding assigned NUMA nodes for the associated slices, the executing comprising the source node going through the list of slices and forwarding each of the slices including the corresponding one or more documents as a data package to a corresponding child node of the execution plan;

providing data responsive to the query to the client;

each pipeline is assigned to a different one of the plurality of NUMA nodes;

only one thread executes a node of the execution graph at any given time;

for a node of the execution graph, internal data structures are initiated lazily when such node is first triggered;

a tick is called by a node of the execution graph for each new incoming data package; and a finishing event is invoked by a node of the execution graph after all of its corresponding parent nodes of the execution graph have been executed.

19. The computer program product of claim 18, wherein:
- the document store stores the documents in JavaScript Object Notation (JSON) format;
- the document store comprises a plurality of partitions defined by a partition specification;
- each partition comprises a plurality of slices and at least one index.

20. The computer program product of claim 18, wherein:
- the document store forms part of a database system having a second database having a different data storage format from the document store and wherein the query implicates data in the second database; and
- the operations further comprise:
  - coordinating execution of a plurality of transactions between the document store and the second database; and
  - persisting all changes specified by the query in the second database including changes implicating data stored within the document store.

* * * * *